TELEVISION FILM SCANNER SYNCHRONIZATION SYSTEM

Original Filed Dec. 12, 1963 2 Sheets-Sheet 1

INVENTORS
PETER C. GOLDMARK &
JOHN M. HOLLYWOOD
BY
Brumbaugh, Free, Graves & Donohue
their ATTORNEYS

TELEVISION FILM SCANNER SYNCHRONIZATION SYSTEM

Original Filed Dec. 12, 1963 2 Sheets-Sheet 2

INVENTORS
PETER C. GOLDMARK &
JOHN M. HOLLYWOOD
BY
Brumbaugh, Free, Graves & Donohue
their ATTORNEYS

United States Patent Office 3,378,635

Patented Apr. 16, 1968

3,378,635

TELEVISION FILM SCANNER SYNCHRONIZATION SYSTEM

Peter C. Goldmark, Stamford, and John M. Hollywood, Greenwich, Conn., assignors to Columbia Broadcasting Systems, Inc., New York, N.Y., a corporation of New York Original application Dec. 12, 1963, Ser. No. 330,193, now Patent No. 3,333,058, dated July 25, 1967. Divided and this application Dec. 21, 1964, Ser. No. 419,762

4 Claims. (Cl. 178—7.2)

This application is a division carved out of our copending application Ser. No. 330,193, now Patent No. 3,333,058, filed Dec. 12, 1963, for "Record Medium and Reproducing System," which, in turn, is a continuation-in-part of our copending application Ser. No. 187,035, now Patent No. 3,290,437, filed Apr. 12, 1962, for "Motion Picture Film and Reproducing Apparatus Therefor."

Both of the aforementioned copending applications relate to apparatus for generating electric signals representative of video and sound information recorded on a thin, narrow film record, which signals may be fed to a standard television receiver used as the ultimate reproducing means.

The present application is addressed to apparatus of this character which utilizes film scanning apparatus of the type disclosed in the copending application Ser. No. 268,911, filed Mar. 29, 1963, in the name of Bernard Erde, for "Film Scanning," and assigned to the assignee of the present application.

For a better understanding of the invention, reference is made to the following detailed description of a representative embodiment, taken in conjunction with the accompanying drawings in which:

FIGS. 1A and 1B taken together constitute a block diagram of a film reproducing system constructed in accordance with the invention;

Figure 1A:
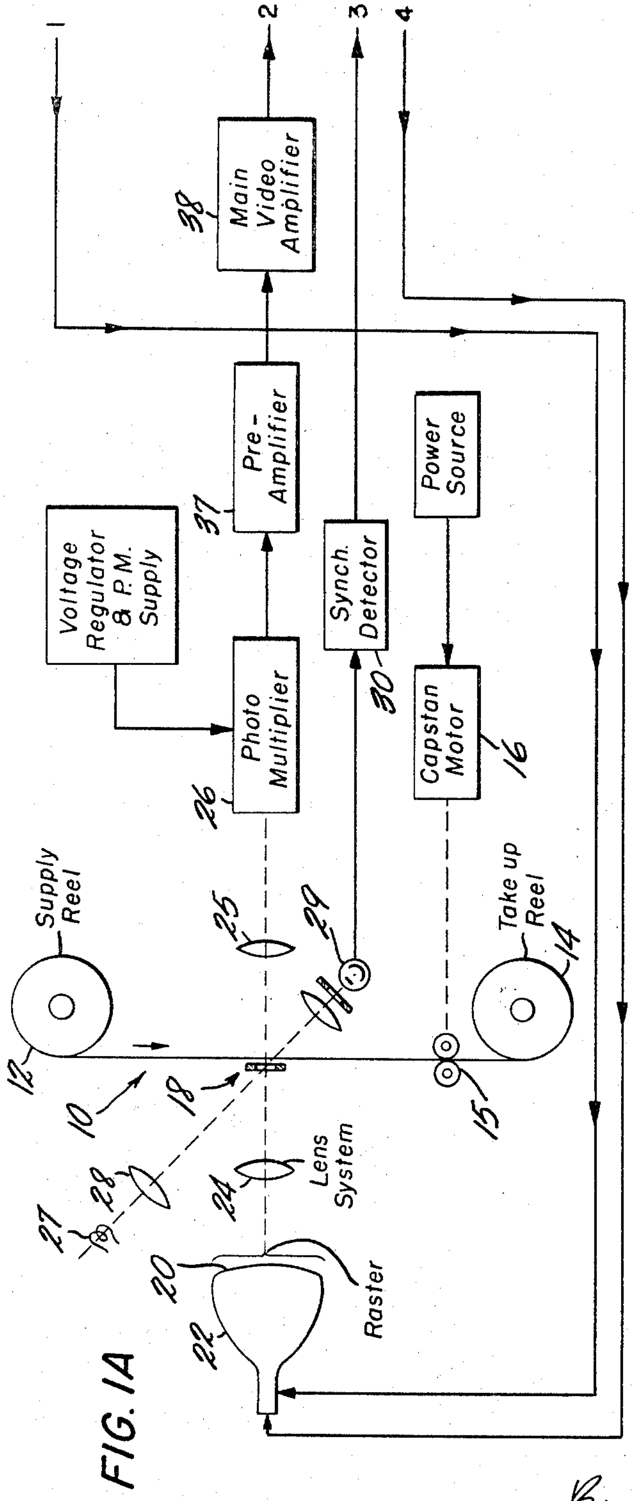

As an example of the method, the reproduction of cinematographic film for television will be described. By the apparatus shown in FIG. 1A, a film 10 is conveyed from a supply reel 12 to a takeup reel 14 by a capstan 15 driven by a motor 16. As will be described in greater detail below, the film 10 traverses a scanning area 18 to which a moving spot of light defining a raster image on the face 20 of a cathode ray tube 22 is directed. The dimension in the direction of film movement of the raster image in the plane of the film 10 is made twice the film frame pitch distance for reasons to be explained below. Suitably focused on the desired area through a lens system 24, the scanning beam passes through the film image where it is modulated according to the density gradations of the image. The modulated beam is directed by a collecting lens system 25 onto a photomultiplier tube 26 which transforms the light beam into a signal representative of the information carried on the film 10. The signal is then transmitted to reproducing circuits as described in greater detail below.

In addition, a separate source of light 27 focused by a lens 28 directs light through the film 10 at an angle to the axis of the lens systems 24 and 25 to a photocell 29 connected to a synchronizing signal detector circuit 30. This circuit is arranged to respond to the synchronizing indicia recorded between frames, which are uniquely different from any information recorded within the frames, to initiate retrace of the vertical scanning motion and, accordingly, this system may be arranged to scan the frames as well as the spaces between them.

Figure 2B:
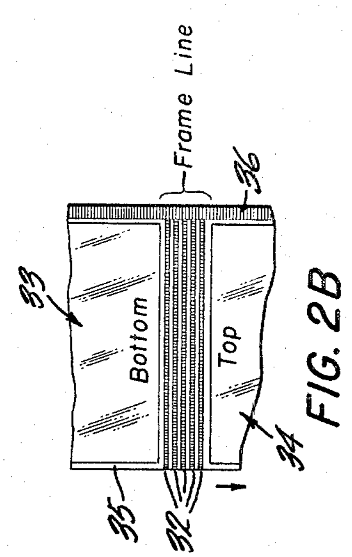
FIG. 2B is a portion of the film record of FIG. 2A, drawn to a greatly exaggerated scale, showing one form of synchronizing indicia.
Figure 2A:
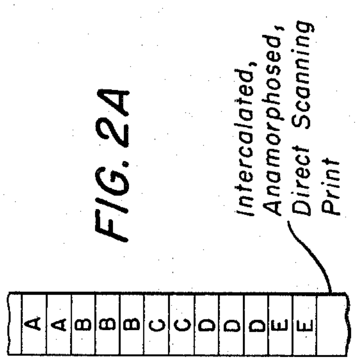
FIG. 2A is a portion of a film record suitable for use in the film reproducing system shown in FIGS. 1A and 1B.

In accordance with the present invention, the record medium may, for example, be made from a material such as "Mylar" having a thickness of about 1 mil and a width of the order of one-quarter inch, preferably without sprocket holes so that each information frame occupies almost the full width of the strip. The film medium contains the orginal information in a number of frames, such that each frame is scanned once. Thus, as shown in FIG. 2A, a release film print made from a standard 24 frames per second original might have the images of the original film repeated in alternate series of two and three adjacent frames to obtain a two to five intercalation, that is, so that the time relationship of the information contained in 24 frames of the original is retained in 60 frames of the print. In the example illustrated, therefore, frames A, C and E are duplicated in the print, while original frames B and D are repeated three times in adjacent frames.

In addition to being intercalated, the images in the release print are preferably in erect or uninverted orientation with respect to the direction of film motion, rather than inverted as in conventional film, so that the raster scan, which is also in the direction of film movement, begins at the top of each frame. While the film print may be made with conventional size frames, it is advantageous to anamorphose or compress the frames of the release print in the direction of film movement, preferably by reducing the vertical dimension of each frame as well as the spaces between frames by one-half or more so that the linear rate of film movement is the same as it would be for the 30 full size frames per second.

In order to synchronize the scanning rate with the film motion, the record medium carries synchronizing marks at locations associated with the frame lines or intervals between frames. In the typical example shown in FIG. 2B, the synchronizing marks comprise a plurality of transverse lines 32 photographically recorded in the spaced between the adjacent frames 33 and 34. These lines extend the ful width of the frames and into the margin 35 on one side, the other margin being occupied by a soundtrack 36 which may be either a magnetic stripe or a photographic track of the usual type. The lines 32 comprising the synchronizing mark in the illustrated embodiment are separated by lines of contrasting density and are preferably spaced uniformly in the direction of motion of the record strip which is indicated by the arrow in FIG. 2B so as to generate a signal of constant frequency in the synchronizing signal detector 30 as the lines pass the photocell 29.

The video information signal from the photomultiplier 26 is applied to a preamplifier 37 and thence to a video amplifier 38. The signal from the main video amplifier 38 is applied to a conventional aperture corrector 39 (FIG. 1B), similar, for example, to that disclosed in U.S. Patent No. 3,011,018 granted to M. E. Sullivan, which modifies the signal to correct for aperture distortion. The signal from the aperture corrector 39 is applied to a conventional gamma corrector 40, similar, for example, to that disclosed in U.S. Patent No. 2,697,758 granted to R. E. Little, which modifies the signal to correct for the nonlinear characteristic of the film record 10.

The main video signal from the gamma corrector 40 is applied to a synchronization mixer 41 which also has applied thereto a series of blanking and synchronization signals from a synchronization generator 42 which are added to the main video signal. The blanking signal provides for blanking out that portion of the main video signal that occurs during horizontal and vertical retrace of the light spot, and the synchronization signal provides for synchronization during reproduction.

The signal from the synchronization mixer 41 is applied to an output lead 43 which may be coupled to remote video reproducing units (not shown). The signal is also applied to a modulator 44 which produces a modulated signal that is applied to one input of a mixer 45. A sound signal from an FM generator 46 is applied to the other input of the mixer 45 which produces a combined video and sound signal that is applied by a conductor 47 to remote conventional television receivers (not shown). The sound signal which is added to the video signal in the mixer 45 is developed by scanning the soundtrack 36 on the film 10 (FIG. 2B) by any conventional means (not shown) to provide a signal which is used to frequency modulate the FM signal generator 46 in the usual manner.

The synchronizing signal developed as the spaced opaque and transparent portions comprising the transverse lines 32 (FIG. 2B) pass between the light source 27 and the photocell 29 is transmitted from the detector circuit 30 to an amplifier 50. The output of the amplifier 50 is limited in a limiter 51 whose output is applied to a transformer 52 used for "floating" purposes. The signal from the transformer 52, "floated" above ground, is applied as a gating input to a sampler 53.

Figure 1B:
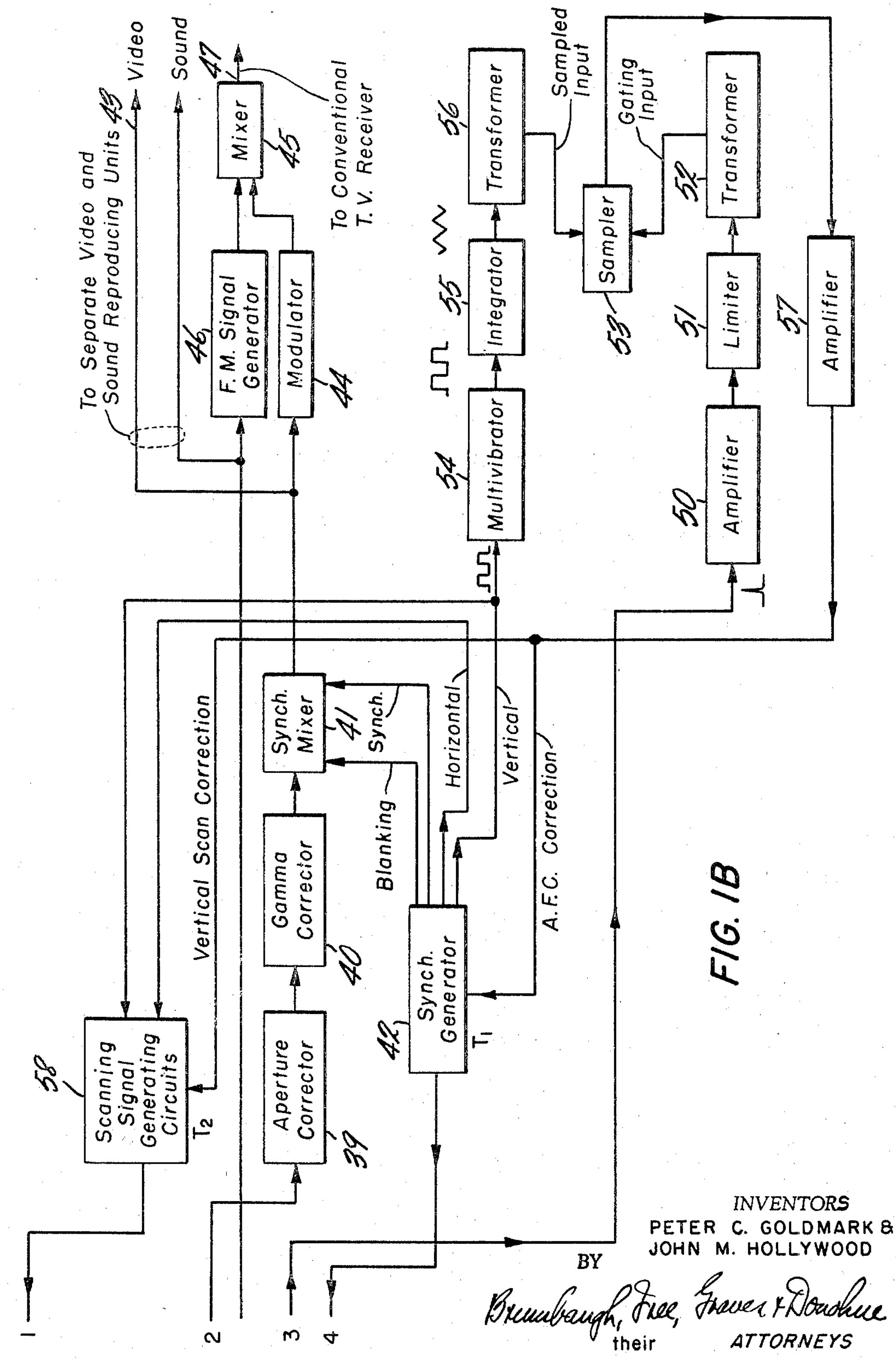

Applied to the sampled input terminal of the sampler 53 is a signal of triangular waveform which is generated as follows. Vertical synchronization pulses from the synchronization generator 42, which are used to trigger the vertical sweep of the light beam in the cathode ray tube 22, are applied to a multivibrator 54. The multivibrator 54 produces a pulse signal that is applied to an integrator 55 which, in turn, develops a signal of triangular waveform as indicated in FIG. 1B. Specifically, the signal increases linearly from a base potential to a peak potential from which it decreases linearly back to the base potential.

The pulses from the multivibrator 54 as integrated by the integrator 55 are chosen so that the signal of triangular waveform commences from a reference potential midway between the base and peak potentials, increasing to the peak potential and then decreasing back to the reference potential during the first one-half portion of the vertical field sweep of the spot of light of the cathode ray tube 22, and then decreasing from the reference potential to the base potential and thereafter increasing back to the reference potential during the remaining half of the field sweep.

The signal of triangular waveform is applied to a transformer 56 which is used to "float" the signal above ground and which couples the signal as a sampled input signal to the sampler 53. When the pulse from the transformer 52 gates the sampler 53, the sampler produces as an output signal that value of the sampled input signal from the transformer 56 at the instant of sampling. As may be seen, then the sampler produces an output signal which is indicative of the time during a field sweep of the scanning light spot when the spot is sweeping by the synchronization markers 32 (FIG. 2B) on the film record 10. Ideally, the light beam should sweep by the markers at the end of a field sweep and, therefore, the output signal from the sampler 53 should be equal to the reference potential of the signal of triangular waveform from the integrator 55.

The output from the sampler 53 is used as a correction signal which is applied to an amplifier 57 and hence to the synchronization generator 42 and to scanning signal generator circuits 58. As applied to the synchronization generator 42, the correction signal from the amplifier 57 constitutes an automatic frequency control corection signal which varies the frequency of the vertical pulses generated by the synchronization generator 42 that are used to initiate the field sweep of the scanning light spot. This changes the frequency of the field sweep so that it conforms and adjusts itself to the frequency at which the frames 33 and 34 (FIG. 2B) of the film record 10 pass through the scanning areas determined by the raster developed on the face of the cathode ray tube 22.

Thus, the film frames pass through the scanning area at a rate of 60 frames per second and this results in a field scanning rate of 60 scansions per second.

As applied to the scanning signal generator circuits, the circuit from the amplifier 57 is a vertical scan correction signal. To elaborate, the scanning signal generating circuits have applied thereto horizontal and vertical synchronization pulses which trigger the generation of sweep signals that are applied to the cathode ray tube 22 and which result in the line and field sweeps, respectively, of the scanning light spot. The vertical scan correction signal from the amplifier 57 varies the vertical sweep signal generated by the generator 58, thereby to shift the position of the field sweep so that it encompasses a frame on the film record 10.

The time constants associated with the scanning signal generating circuits 58 and the synchronization generator 42 may be adjusted and proportioned so that the scanning signal generating circuits 58 respond more quickly to the correction signal from the amplifier 57 than does the synchronization generator 42. In this fashion, a signal from the amplifier 57 first manifests itself in a change in the field sweep location, and, if this is not sufficient to provide a complete correction in the sweep, a later change in the field sweep frequency is made.

As may be noted, the synchronization generator 42 is an independently running pulse generator whose vertical pulse frequency is variable in accordance with the correction signal from the amplifier 57.

In operation, the raster on the picture tube 22 is adjusted so that the image thereof formed on the film 10 has a dimension in the direction of film movement that is twice the film frame pitch, and the film is advanced continuously in the same direction as the raster scan at a frame rate of 60 frames a second. The synchronizing indicia 32 (FIG. 2B) interrupt the light passing to the photocell 29 and generate synchronizing pulses in the synchronization detector 30 which gate the sampler 53 (FIG. 1B), producing an error signal output therefrom to maintain synchronism between the film movement and the signals generated by the synchronizing generator 42.

So long as synchronism is thus maintained, each frame on the film 10 will be completely scanned by a full raster scan (i.e., the scanning spot scans a succession of lines from the top to the bottom of each frame as that frame moves through the frame pitch distance). If, for any reason, a gradual change in film speed occurs, the synchronizing signals generated by the synchronizing generator 42 will automatically be changed as required to maintain synchronism.

Similarly, any instantaneous variations in film speed will result in the application of a compensating correction to the scanning signal generating circuits 58.

The invention thus provides novel and highly effective apparatus for reproducing video information recorded on a record strip. By shifting the frequency of scansion as well as their locations on a scanning area in response to synchronizing indicia on the film, the scanning action of the scanning television tube (and of the reproducing television picture tube) can be accurately synchronized with the moving film. Further, by adjusting the scanning raster dimension in the direction of film movement to be twice the film frame pitch, and by utilizing film having frames which are erect with respect to the direction of motion instead of inverted as in the prior art, the film can be effectively scanned without the necessity for complex and expensive optical chasing equipment.

It will be apparent that the illustrative embodiment described above is capable of modification within the spirit of the invention. Accordingly, the invention is intended to encompass all such modifications as fall within the scope of the following claims.

We claim:

1. In apparatus for reproducing information recorded in a succession of frames on a record strip having longitudinally spaced apart synchronizing indicia recorded therein in predetermined relation to said frames, the combination of (a) means for transporting a record strip through a scanning zone, (b) scanner means for subjecting said record strip, in said zone, to a plurality of longitudinally spaced apart transverse line scans executed in succession in the direction of movement of the record strip, to generate first signals representing information recorded in said frames, (1) said succession of line scans defining a raster extending in the direction of record strip movement a distance equal to twice the frame pitch distance on the record strip, (c) means for scanning synchronizing indicia recorded on said record strip to generate second signals representative thereof, (d) control signal responsive vertical scanning signal generator means for said scanner means, and (e) means responsive to the output of said scanning signal generator means and to said second signals for supplying a control signal output to said scanning signal generator means.

2. Reproducing apparatus as defined in claim 1 in which the means for generating said first signals comprises (a) transverse deflection signal generator means, (b) a cathode ray tub having (1) an electron beam, (2) first deflection means connected to said transverse deflection generator means to deflect said beam to produce said line scans, and (3) second deflection means connected to said control signal responsive signal generator means to displace said successive line scans and produce said raster, (c) a photosensitive device, and (d) optical means for directing radiant energy from said raster to said photosensitive device.

3. Reproducing apparatus as defined in claim 2 in which the means for scanning said synchronizing indicia includes separate photosensitive means and separate light source means for directing light through said optical means and the portion of said record strip containing said indicia to said photosensitive means.

4. Reproducing apparatus as defined in claim 1 in which the means for supplying a control signal output to said control signal responsive vertical scanning signal generator means comprises (a) means responsive to the output from said control signal responsive vertical scanning signal generator means for producing a saw-tooth wave, and (b) sampler means jointly responsive to said saw-tooth wave and to said second signals for producing a control signal output.

References Cited

UNITED STATES PATENTS

| | | | |
|---|---|---|---|
| 2,189,351 | 2/1940 | Schroter | 178—7.2 |

FOREIGN PATENTS

| | | |
|---|---|---|
| 136,936 | 4/1950 | Australia. |

ROBERT L. GRIFFIN, *Primary Examiner.*

R. L. RICHARDSON, *Assistant Examiner.*